United States Patent [19]

Asher

[11] Patent Number: 4,891,755

[45] Date of Patent: Jan. 2, 1990

[54] SYSTEM FOR DETECTING REMOVAL OF ITEMS FROM A HOTEL MINIBAR AND FOR THE AUTOMATIC CHARGING OF THE BILL OF THE GAS FOR ITEM REMOVED FROM THE MINIBAR

[76] Inventor: Amram Asher, House 54, Moshav Sitriya, Israel

[21] Appl. No.: 195,784

[22] Filed: May 5, 1988

[30] Foreign Application Priority Data

May 6, 1987 [IL] Israel .......................................... 82433

[51] Int. Cl.$^4$ .......................... A47F 1/04; F25D 25/02; G06F 15/21
[52] U.S. Cl. .................................. 364/406; 235/383; 364/401
[58] Field of Search ...................... 364/406, 401, 408; 235/383

[56] References Cited

U.S. PATENT DOCUMENTS 3,836,755  9/1974  Ehrat .................................. 235/383
4,629,090  12/1986  Harris .................................. 221/7

FOREIGN PATENT DOCUMENTS 2573889  7/1986  France .
1438823  6/1976  United Kingdom .
2135292  8/1984  United Kingdom .
2161630  1/1986  United Kingdom .

Primary Examiner—Jerry Smith
Assistant Examiner—Gail O. Hayes
Attorney, Agent, or Firm—Browdy and Neimark

[57] ABSTRACT

The invention relates to minibars located in hotel rooms, and more specifically to such minibars provided with means for ascertaining whether any item has been removed, its nature and its price, thus facilitating the recharging of the minibar and the charging of the bill of the guest for the item taken.

The system is based on accurate weight measurements which are indicative of the kind of item removed by the guest.

8 Claims, 1 Drawing Sheet

U.S. Patent  Jan. 2, 1990  4,891,755
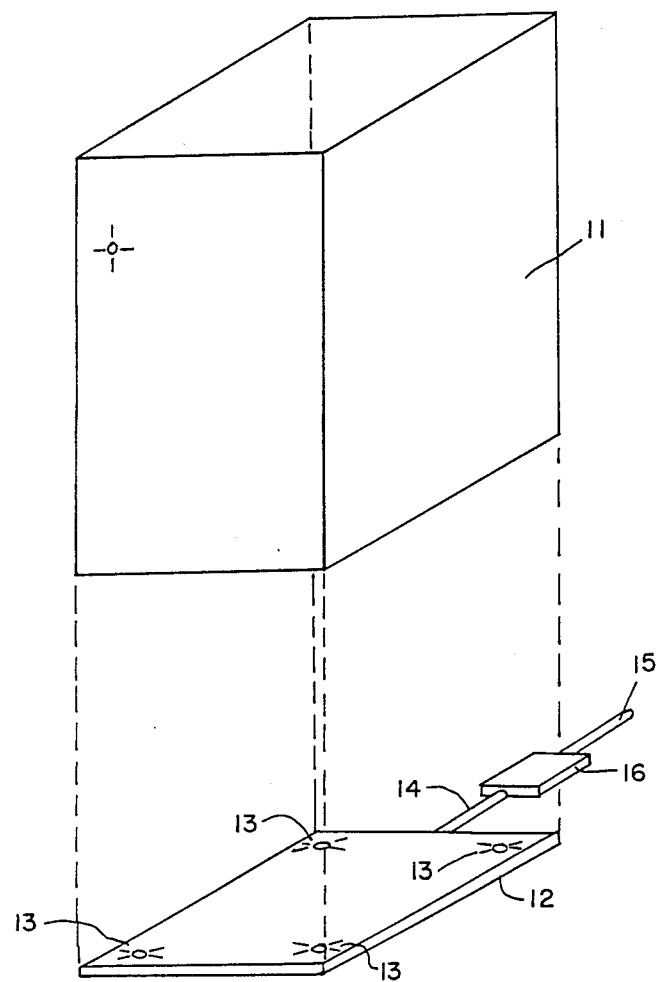

SYSTEM FOR DETECTING REMOVAL OF ITEMS FROM A HOTEL MINIBAR AND FOR THE AUTOMATIC CHARGING OF THE BILL OF THE GAS FOR ITEM REMOVED FROM THE MINIBAR

FIELD OF THE INVENTION

There are provided means to detect and automatically debit removal of any item stored in a minibar in hotel rooms, and provide a record for the replenishment of such items.

The device according to the invention is based on the accurate detection and recordal of the removal of any item stored in a minibar, the detection being by means of accurate determination of weight changes.

BACKGROUND OF THE INVENTION

In hotels all over the world, minibars are provided in many thousands of rooms. These are stocked with a variety of items, generally mini-bottles of strong alcoholic drinks, with some cans of beer or soft drinks, some bottles of wine, and the like.

The control and charging of items used by hotel guests is cumbersome and requires substantial manpower. Furthermore, when a rapid checkout of the guest is effected, there is generally no up-to-date data available as to the exact quantity of goods removed from the minibar.

Various solutions have been proposed, amongst these the provision of individual small compartments in the refrigerator, each housing only one bottle or can, means being provided for the detection and recordal of each such removal, this being effected by electronic means. There has also been suggested the use of micro-switches and proximity switches for each stored item.

There have been suggested the use of magnetic markers on each bottle or can, and the provision of corresponding magnets in the mini-bar, thus detecting removal of each item. None of the solutions suggested hitherto have found acceptance as they are complicated and not reliable. Furthermore, the subdividision of the space in the refrigerator into sub-units hinders air-circulation and cooling.

The present invention provides a system adapted to overcome the drawbacks of existing systems.

SUMMARY OF THE INVENTION

There is provided a system for recording and automatically debiting the removal of any item from a minibar provided in a hotel room. The system overcomes the problem of theft and of cheating; it substantially reduces the manpower needed for maintaining the minibars in the rooms of the hotel in good operational condition. The novel system is provided with each minibar in a hotel room, and this system is connected with the central computer of the hotel. Removal of any item from the minibar is recorded, providing information to the computer also with regard to the charge to be made for such item, which is automatically recorded on the charge-sheet of the guest. The system is comparatively simple, and can be operated with a minimum of manpower, which is required mainly for the replenishment of the content of the minibar.

According to the invention, there is provided a system which weighs in an accurate manner the minibar, and which records, after a certain time-delay, the weight of each item removed, the weight being indicative of the nature of the product and its price.

Actually the items in such a minibar can be subdivided as regards weight into a number of classes: mini-bottles, beer-cans, cans of soft drinks, small bottles of wine, etc. Each of the subgroups is characterized by a definite narrow range of weights, and the sensitivity of an accurate balance is such that it is easily capable of distinguishing between such items.

Accordingly the system of the invention provides means for accurately determining any change of weight of the minibar, said weighing system being connected to computer and recording means whereby the item removed is identified, its price is established, the guest is charged, and there is provided information with regard to what item is to be supplied to re-stock the specific minibar.

The means used for determining the change of weight can be a balance having adequate sensitivity; there can be provided a unit comprising one or more strain-gauges on which the minibar is positioned. Sensitive balances attain with ease a sensitivity of at least 1/100%: thus for a fully loaded minibar of say 40 kg total weight, a change of 4 grams is easily detected. Sensitive strain gauges (loadcells or other suitable transducers) have an adequate sensitivity, and also these can be used for recording such weight changes.

In practice, the computer will be programmed so as to record only a removal after a certain predetermined time-lag, as it is possible that the guest will remove a bottle, examine it and return it, having decided not to use it. Thus a time lag of say 30 to 60 seconds is indicated. As the various groups of items differ substantially in weight, it is easily determined whether a mini-bottle of an alcoholic beverage, a can of beer or soft drink, or a bottle of wine or a bottle of soda-water is removed.

There exists the problem of distinguishing between different types of alcoholic drinks (cognac, whiskey, gin, etc.), but this is more a question of replenishment than of charging, as they can be priced the same price.

There can be provided a unit on which the mini-bar is positioned, or the weighing-unit can form an integral part of the min-bar. When used as a separate unit, the minibar is positioned on such unit, and this comprises one or more sensitive sensing elements capable of detecting and identifying by weight change as to which type of item stocked in the minibar has been removed, with means being provided for recording such permanent removal.

Experiments have shown that sensitive balances have an adequate degree of accuracy. There may also be used one or more strain gauges of adequate sensitivity. Other sensing elements adapted to detect such weight changes can also be used.

BRIEF DESCRIPTION OF THE DRAWINGS

The FIGURE is a schematic view of the minibar according to the present invention.

DETAILED DESCRIPTION OF THE PREFERRED EMBODIMENT

The invention is illustrated with reference to the enclosed schematic drawing in which 11 designates a conventional mini-bar, which is positioned on the stand 12 which comprises four strain gauges (load cells, or transducers) 13, the output of which is passed via wire 14 and through microprocessor 16 via conduit 15 to the central computer of the hotel. Any change of the weight of the mini-bar resulting from removal of an item from same is noticed, identified as to the nature of the item and recorded, thus automatically charging the user for the item removed. The hotel guest is not aware of the mechanism used and has no incentive or possibility to cause any damage to the device.

The device saves manpower and substantially reduces thefts of goods from mini-bars. The unit comprising the load cells can be a separate one, or it can be integral with the mini-bar, in which case nothing of it is apparent to the outside.

The bar can be provided with a display indicating the sum of the total charge or number of items and charge.

I claim:

1. A system for detecting removal of items from a hotel minibar and for the automatic charging of the bill of the guest for each item removed from the minibar, comprising means for accurately detecting the removal of each item by establishing the resulting change of weight of the minibar, means for identifying the removed item according to a number of subclasses differing in weight from each other, and for charging the account of the guest according to the identified item removed.

2. A system according to claim 1, comprising time-delay means according to which the charge is made only after a certain time delay, thus ascertaining the permanent removal of the item.

3. A system according to claim 1, wherein the system is an integral part of the minibar.

4. A system according to claim 1, wherein the minibar is positioned on the system for determining weight changes.

5. A system according to claim 1, wherein the change of weight is determined by an accurate balance.

6. A system according to claim 1, wherein the change of weight is determined by one or more strain gauges.

7. A system according to claim 1, connected directly to the computer of the hotel, a program being provided for identifying items removed and their price, and for charging the guest for each such item.

8. A device according to claim 1, provided with a display of the cumulative charges.

* * * * *